Figure 1:
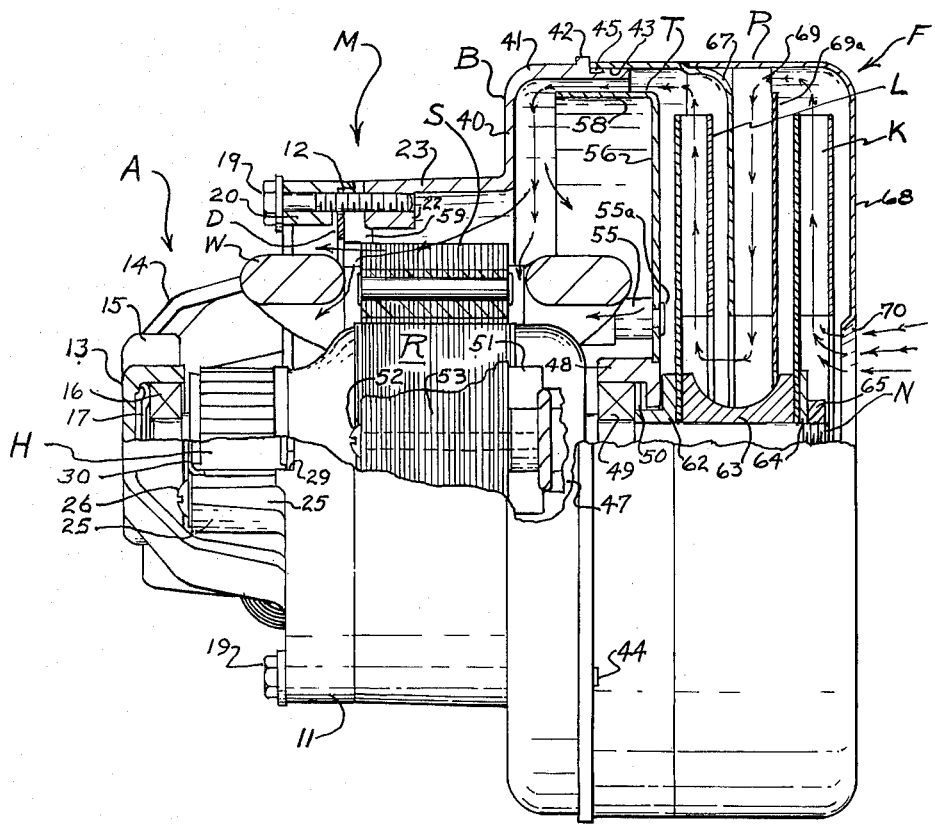

April 12, 1966     A. L. SEBOK ET AL     3,245,610

MOTOR-FAN UNIT FOR VACUUM CLEANERS

Filed Jan. 2, 1964

INVENTORS
ALBERT L. SEBOK, WILLIAM H. TAYLOR

By: Philip D. Golrick
ATTY.

United States Patent Office 3,245,610
Patented Apr. 12, 1966

3,245,610
MOTOR-FAN UNIT FOR VACUUM CLEANERS
Albert L. Sebok, Tallmadge, and William H. Taylor, Kent, Ohio, assignors to Ametek, Inc., New York, N.Y., a corporation of Delaware
Filed Jan. 2, 1964, Ser. No. 335,089
4 Claims. (Cl. 230—117)

The present invention relates generally to motor-fan units, and more particularly to improvements in an electric motor-fan unit which, though especially useful in vacuum cleaners, also has utility and advantages for other service environments in which an electric motor driven blower or suction unit is required.

The present invention is generally concerned with and has as one important object the provision of a simple relatively low cost motor-fan unit which is nonetheless adapted to cooler running. Another object is the provision of a unit of the character described including primary frame elements permitting of a ready brush position adjustment, which further attains an efficient air discharge from the fan section through the motor with effective and improved motor cooling. Another specific object is the provision of cooperating primary frame elements into which a motor stator or field structure is easily assembled or mounted. A still further object is the provision in a motor-fan unit of improved primary frame elements enclosing the stator in combination with baffle elements so positioned and of such form that improved efficiency in air discharge and cooling of the motor by air from the fan or blower section is attained at relatively low cost.

For the attainment of these objects the present invention proposes the use of a fan end bracket member for the motor section which, as an integral structure, is adapted for production as a die casting having a generally cylindrical body portion surrounding the field lamination stack and enlarged at the fanward end into a mounting rim for a fan shell or housing telescoped and secured thereon. The enlargement further is spanned interiorly by an integral motor bearing socket supporting spider also providing field or stator core seating or mounting bosses to which the field structure is secured by bolts passed through the core. The shape of the stator or field laminations is of non-circular form and the inside of the cylindrical body wall of the fan end bracket member is provided with inward bosses or projections cooperatively engaging with the field stack to guide the field into proper position relative to the seating and securing bosses, and further under some conditions to aid in fixing the angular position of the stator relative to the fan end bracket member. Further, the shape of the punchings and the resulting stack is such as define with the surrounding body portion of the fan end bracket member a series of longitudinal air discharged passageways leading from what in effect is a plenum discharge chamber in the enlarged end to the commutator end region and brushes secured on a commutator end bracket member. The latter is fitted on and secured endwise to the fan and bracket member in a manner permitting a limited adjustable positioning of the two frame or bracket members and thereby brush adjustment relative to the field. Further in the enlarged end are provided integral supports on which may be secured a drawn shallow cup-shaped sheet metal fan end baffle and discharge shroud member. There is further secured in the abutting or adjoining region of the two frame members a simple baffle plate adapted to direct the discharge air flow over the field windings, brush holders and commutator end bearing in a manner adapted to secure excellent cooling or ventilation.

Figure 2:
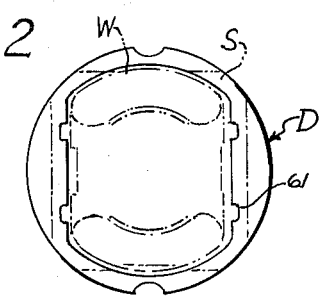
Figure 3:
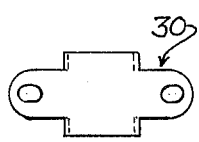
Figure 4:
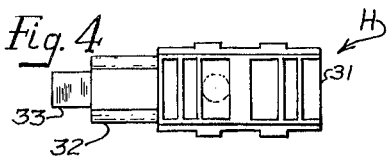

Other objects and advantages of the invention will appear from the following description and the drawings wherein:

FIG. 1 is a view partially in elevation and partially in section showing one form of the invention;
FIG. 2 shows a form of baffle plate in solid lines, on which is superimposed in dotted lines the outline of the stator or field construction proximate thereto in the motor section;
FIG. 3 is a plan view of a brush clamp member;
FIG. 4 is a bottom view of a brush holder in accordance with the present invention.

In the motor-fan unit represented in the drawings (see FIG. 1) as embodying the present invention, the motor section M and fan section F include as principal components or sub-assemblies, first as the motor sub-assembly the commutator end bracket A and fan end bracket B as main frame elements rotatably mounting through suitable bearings a commutating rotor or armature R coaxially disposed in a motor field or stator structure S, ventilating air directing baffle plate D, and brush holder units H supported in the commutator end bracket, and secondly in a two stage fan sub-assembly or section the first and second stage centrifugal fans or impellers K, L mounted in axially spaced relation and clamped on the motor shaft N, a two stage fan shell sub-assembly or housing P, and also a second stage fan chamber end baffle and shroud member T.

The commutator end bracket member A as an integral structure includes a short cylindrical rim portion 11 internally rabbeted at 12 and fitted on the left end of the fan end bracket B, and a bearing socket 13 joined to the rim by outwardly offsetting or rim bridging spider arms 14. The socket is provided with integral cooling fins 15 for dissipation of heat from the ball bearing unit 16 having an outer race slidably received in the socket recess and acted upon by a thrust member 17 interposed between the outer race and the socket bottom wall. A pair of diametrically disposed clamping bolts 19 extend through coaxially arcuately slotted integral boss formations 20, on the inner face of the rim 11 for threaded engagement with threaded bosses 22 on the inside surface of a body portion 23 of fan end bracket member B, thereby to hold the members A and B together and constituting a motor frame, while permitting some limited adjustment of the position of brushes in the brush holders H.

Integral brush holder seats or mounting formations 25 are provided at diametric rim locations on member A, for respective brush holder units H secured therein, each by a pair of clamping screws 26 through opposite ends of a clamping member 30 bearing on an insulation tube 31 for the brush guide tube 32 containing the spring biased brush 33.

In the second primary frame member of the motor section, the fan end bracket member M, a generally cylindrical body portion 23 is connected at its fanward end through an integral radial flange 40 to a short cylindrical rim portion 41 having an external circumferential bead 42 serving as a stop for a portion of the sheet metal fan housing P telescoped onto the free end of the rim at 43, the housing being retained by an indentation of the metal at a plurality of locations 44 into engagement with a shallow circumferential groove 45 in the rim.

Spanning the opening of the member B thus formed by the end enlargement appearing in 40, 41 is a generally diametrically extended integral spider formation 47 having at its center the bearing socket 48 for the roller bearing unit 49 with inner race lightly pressed on the motor shaft N and lubricating and spacing washers generally designated as 50; a pair of spaced stator stack seating bosses 51 being provided on the spider into which are threaded respective field mounting screws 52 running lengthwise through the stator core or field stack of laminations 53.

The member B is further provided with a plurality of angularly spaced posts 55 projecting towards the fan end from wall 40, each of which initially is provided with a short straight reduced portion on which is mounted the central disc-like portion 56 of a shallow drawn sheet metal end baffle and shroud member T retained by hot staking or forming over the reduced end as indicated at 55a into a rivet-like retaining head. The short cylindrical rim or flange 58 of the member T provides a shroud formation in spaced relation to the interior of the rim 41 to define a discharge air diffusing and guiding passageway from the fan housing hereinafter described.

Pairs of integral lugs 59 projecting inwardly from the wall or body portion 23 in circumferentially spaced relation are provided at the left end of the member B to embrace loosely respective corners of the field lamination stack, which here has a generally square external outline, with rounded corners however to fit within the body 23 as indicated by the dotted line outline in FIG. 2. Externally the left end of the body 23 has a circumferential rabbet onto which is fitted the rabbeted rim portion of member A permitting rotational adjustment as previously stated. Further the air deflecting ring or plate, outlined in solid lines in FIG. 2, is located or embraced between the fitted ends of the members A and B and can be held in exact position by surfaces lying within the rabbeted portion of member A and on the end of the rabbeted portion of member B. A somewhat square opening in the member D defines the periphery of the space available for air discharge from the field region of the motor, that is, passing axially in the longitudinal spaces defined between the body portion 23 of member B and the flat sides of the stator iron 53. The stator or field winding coils W extend axially outward beyond the member D shaped to accommodate the same, the location of D in the final assembly causing air to flow not only over the radially outward portions of the windings W, but also inwardly between the end of the windings and the adjacent field core to pass under the interior or inward surfaces and thereafter over the commutator to discharge through the open regions of the member A. At opposite sides the effective width of the ring or plate is greater to impede in some degree air flow between field core and body 23 at locations 90 degrees from the coils and to direct the actual air flow more sharply inwardly over the end of the rotor and commutator towards the brushes and brush holder region. In plate D notches 61 are provided field winding leads.

In the fan shell and fan assembly, the structure is rather conventional, the two sheet metal type impellers being clamped on the projecting end of the motor shaft N by a radially flanged spacer sleeve 62, with one end engaging the inner race of the bearing unit 49, and the spacer spool 63 engaging with apertured central region of the second stage impeller, and the spacer spool 63 and a heavy clamping washer 64 engaging similarily the first stage impeller, all held by a clamping nut 65 threaded onto the threaded end of the shaft N.

The two stage housing P is formed of two drawn sheet metal cup-shaped members 67, 68; shell 68 for the first stage being telescoped upon that of the second which in turn is telescoped upon the rim 41 as previously described. A central primary air inlet opening 70 is provided in the radial end wall of the first stage shell 68; and on the corresponding wall of the second stage shell there is mounted a set of angularly spaced air guide vanes 69 upon which in turn is mounted a disc 69a with periphery spaced from the circumferential or cylindrical wall portion of the member 68 both to define a first stage fan chamber with member 68 and to provide passages for air discharge from the periphery of the first stage impeller K returning the air inwardly towards a central inlet opening of the end wall of 67 as the inlet to the second stage fan chamber defined between shell 67 and wall 56 of member T for the impeller L. Air discharging from the periphery of L then is turned to flow axially between the shroud 58 and rim 41 towards the motor into a plenum or air discharge chamber defined between radial wall 40 and rim 41 of the enlarged end of the bracket member B, the field core and member T, then flowing over the exterior of the windings W, the stator core, through the longitudinal passages previously described and also inwardly between the field and rotor to pass axially through and around the electrical or electro magnetic components of the motor for effective cooling.

We claim:

1. In a motor-fan unit including a motor section having a field structure with an externally non-cylindrical core and windings on the core and a fan section, a construction adapted to obtain lowered motor running temperatures with a relatively simplified structure comprising:

in the motor section, as primarily frame elements
a first end bracket having as an integral member a generally cylindrically hollow body with a first end enlarged through a joining portion to a cylindrical rim, a transverse, motor shaft bearing socket-support including a motor shaft bearing receiving socket, field core seating and mounting bosses projecting toward core-receiving space within the said body and adapted to threaded engagement of securing bolts passed through the core, and a plurality of angularly spaced posts within and projecting toward the end opening of the said rim, each said post having an end portion of reduced diameter,
a second end bracket as an integral member having an end rim to fit on the second end of the first bracket, a motor shaft bearing socket, and also at spaced locations on the rim apertured formations for receiving bolts threaded endwise into the first end bracket,
an air controlling and directing, generally annular, plate retained between the adjacent ends of the brackets at a location exterior of end portions of field windings projecting therethrough;
in the fan section
a shallow cup-shaped fan shell having a central air inlet opening and cylindrical flange fitted onto the rim of the first member,
a shallow cup-shaped, fan chamber end baffle and shroud member apertured to receive the reduced ends of said posts, and secured on the first end bracket by head-like deformations of said reduced ends of the posts,
a centrifugal impeller in a fan chamber formed by said cup-shaped shell and member and secured on a shaft of a motor rotor journalled in bearings supported in said sockets, and
the said cup-shaped member having a cylindrical flange internally spaced from the rim of the first bracket to form a circumferential discharge air passageway from the fan chamber into a discharge chamber defined between the said enlarged end, the last said member and the motor field structure,
said bearing socket support and field windings projecting into said discharge chamber,
air from said discharge chamber exhausting through longitudinal passages formed between said cylindrical body and said externally non-cylindrical core towards said annular plate and between a motor rotor and said field core.

2. The structure of claim 1, including
a said field having a core of generally square outline held on said seating and mounting bosses in coaxial relation to said first end bracket by securing bolts, and defining with said body said longitudinal air passages exterior of the core, said annular plate being retained in endwise spaced relation to said core by action of opposed surfaces of said bracket members, and shaped to direct air from said passages across end turns of field windings on said core.

3. The structure of claim 1, including for a commutating motor integral brush holder mounting seat formations at diametric locations of the second end bracket,
said apertured formations being integrally formed arcuately slotted formations at other diametric locations whereby brush holders in said seat formations may be angularly adjusted relative to said field,
and said annular plate adapted also to direct air from said longitudinal passages toward inner ends of said brush holders and brushes contained therein.

4. The structure of claim 2, including
a said field having a core of generally square outline held on said seating and mounting bosses in coaxial relation to said first end bracket by securing bolts, and defining with said body said longitudinal air passages exterior of the core leading, said annular plate being retained in endwise spaced relation to said core by action of opposed surfaces of said bracket members, and shaped to direct air from said passages across end turns of field windings on said core and inwardly toward the commutator and brush region of the motor.

References Cited by the Examiner
UNITED STATES PATENTS

| | | | |
|---|---|---|---|
| 1,860,885 | 5/1932 | Bilde | 230—117 |
| 2,531,342 | 11/1950 | Metz | 230—117 |
| 2,713,455 | 7/1955 | Cole | 230—117 |
| 2,726,033 | 12/1955 | Sheahan | 230—117 |
| 2,915,237 | 12/1959 | Galiulo et al. | 230—117 |
| 2,947,895 | 8/1960 | Wray | 310—239 |
| 2,973,895 | 3/1961 | Brown et al. | 230—117 |
| 3,032,672 | 5/1962 | Blachly | 310—239 |

ROBERT M. WALKER, *Primary Examiner.*

LAURENCE V. EFNER, *Examiner.*